(12) United States Patent
Niinuma et al.

(10) Patent No.: US 8,498,462 B2
(45) Date of Patent: Jul. 30, 2013

(54) IMAGE PROCESSING APPARATUS AND PROGRAM

(75) Inventors: Hiroyuki Niinuma, Baltimore, MD (US); Kakuya Kitagawa, Baltimore, MD (US); Joao A. C. Lima, Baltimore, MD (US); Yasuko Fujisawa, Otawara (JP); Miwa Okumura, Utsunomiya (JP)

(73) Assignees: Toshiba Medical Systems Corporation, Otawara-shi (JP); The Johns Hopkins University, Baltimore, MD (US)

( * ) Notice: Subject to any disclaimer, the term of this patent is extended or adjusted under 35 U.S.C. 154(b) by 1166 days.

(21) Appl. No.: 12/236,934

(22) Filed: Sep. 24, 2008

(65) Prior Publication Data

US 2009/0268954 A1    Oct. 29, 2009

(30) Foreign Application Priority Data

Apr. 25, 2008    (JP) .................... 2008-115020

(51) Int. Cl.
*G06K 9/00* (2006.01)
(52) U.S. Cl.
USPC .......................................................... 382/130
(58) Field of Classification Search
USPC .................. 382/128, 130, 131, 133, 256, 259
See application file for complete search history.

(56) References Cited

U.S. PATENT DOCUMENTS

| 8,094,896 B2 * | 1/2012 | Dutta et al. ............ 382/128 |
| 8,298,147 B2 * | 10/2012 | Huennekens et al. ....... 600/443 |
| 2005/0180621 A1 * | 8/2005 | Raman et al. ............. 382/128 |

FOREIGN PATENT DOCUMENTS

| JP | 11-342132 | 12/1999 |
| JP | 2003-310601 | 11/2003 |
| JP | 2004-065975 | 3/2004 |
| JP | 2005-185575 | 7/2005 |
| JP | 2006-524096 | 10/2006 |
| JP | 2007-502676 | 2/2007 |
| JP | 2007-275318 | 10/2007 |

OTHER PUBLICATIONS

Gary S. Mintz, et al., "American College of Cardiology Clinical Expert Consensus Document on Standards for Acquisition, Measurement and Reporting of Intravascular Ultrasound Studies (IVUS)", Journal of the American College of Cardiology, vol. 37, No. 5, ISSN 0735-1097/01, 2001.

Farouc A. Jaffer, et al., "Age and Sex Distribution of Subclinical Aortic Atherosclerosis. A Magnetic Resonance Imaging Examination of the Framingham Heart Study", Arterioscler Thromb Vasc Biol., May 2002, pp. 849-854.

(Continued)

*Primary Examiner* — Marcos D. Pizarro
*Assistant Examiner* — Diana C Vieira
(74) *Attorney, Agent, or Firm* — Oblon, Spivak, McClelland, Maier & Neustadt, L.L.P.

(57)    ABSTRACT

An image processing apparatus includes a storage unit which stores volume data associated with an area including a contrast-enhanced artery as an examination target, a first calculation unit which calculates a plurality of partial atherosclerotic indexes associated with a plurality of portions of the artery on the basis of morphological information associated with the artery which is obtained from the volume data, a second calculation unit which calculates a whole atherosclerotic index associated with the entire artery including the plurality of portions on the basis of the morphological information associated with the artery, and a display unit which displays evaluation information based on the calculated whole atherosclerotic index.

5 Claims, 7 Drawing Sheets

OTHER PUBLICATIONS

Roberto Corti, et al., "Lipid Lowering by Simvastatin Induces Regression of human Atherosclerotic Lesions", Journal of the American Heart Association, Circulation, vol. 106, No. 23, Dec. 3, 2002, pp. 2884-2887 (with cover page).

João A.C. Lima, et al., "Statin-Induced Cholesterol Lowering and Plaque Regression After 6 Months of Magnetic Resonance Imaging-Monitored Therapy", vol. 110, No. 16, Journal of the American Heart Association, Circulation, Oct. 19, 2004, pp. 2336-2341 (with cover page).

Atsushi Yonemura, et al., "Effect of Lipid-Lowering Therapy With Atherosclerotic Aortic Plaques Detected by Noninvasive Magnetic Resonance Imaging", Journal of the American College of Cardiology, vol. 45, No. 5, May 2005, pp. 733-742.

Isabel M. Adame, et al., "Automatic Vessel Wall Contour Detection Quantification of Wall thickness in In-Vivo MR Images of the Human Aorta", Journal of Magnetic Resonance Imaging, 2006, pp. 595-602.

Christophe Caussin, "Comparison of Coronary Minimal Lumen Area Quantification by Sixty-Four-Slice Computed Tomography Versus Intravascular Ultrasound for Intermediate Stenosis", The American Journal of Cardiology, 2006, pp. 871-876.

Alexander W. Leber, et al., "Accuracy of Multidetector Spiral Computed Tomography in Identifying and Differentiating the Composition of Coronary Atherosclerotic Plaques", A Comparative Study With Intracoronary Ultrasound, Journal of the American College of Cardiology, vol. 43, No. 7, 2004, pp. 1241-1247.

Stephan Achenbach, et al., "Detection of Calcified and Noncalcified Coronary Atherosclerotic Plaque by Contrast-Enhanced, Submillimeter Multidetector Spiral Computed Tomography. A Segment-Based Comparison With Intravascular Ultrasound", Journal of the American Heart Association, vol. 109, No. 3, 2004, pp. 14-17 (with cover page).

Alexander W. Leber, et al., "Accuracy of 64-Slice Computed Tomography to Classify and Quantify Plaque Volumes in the Proximal Coronary System", Journal of the American College of Cardiology, vol. 47, No. 3, 2006, pp. 672-677.

Karsten Pohle, et al., "Characterization of non-calcified coronary atherosclerotic plaque by multi-detector row CT: Comparison to IVUS", Atherosclerosis, 2007, pp. 174-180.

Japanese Office Action mailed Dec. 18, 2012 issued in Japanese Application No. 2008-115020 (with English translation).

* cited by examiner

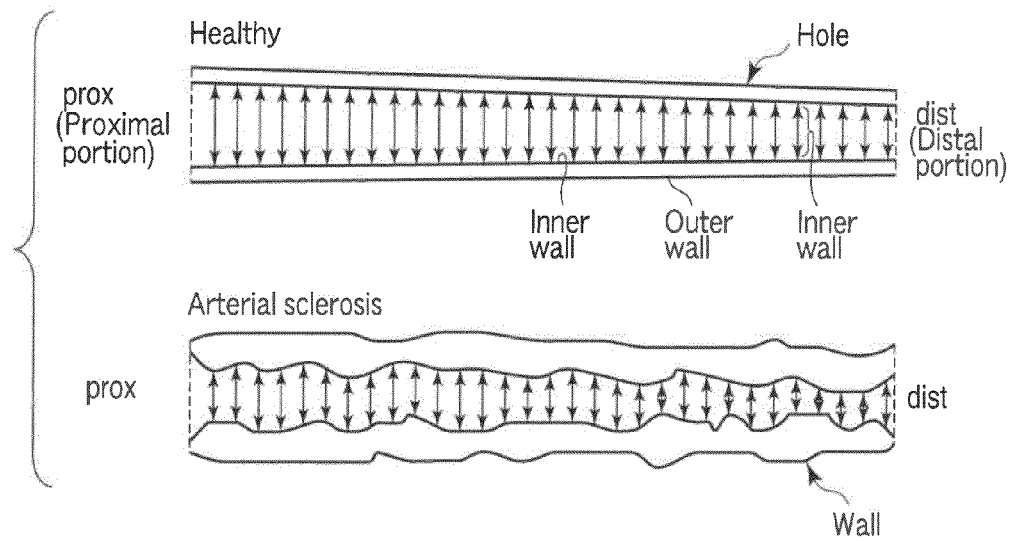
F I G. 4
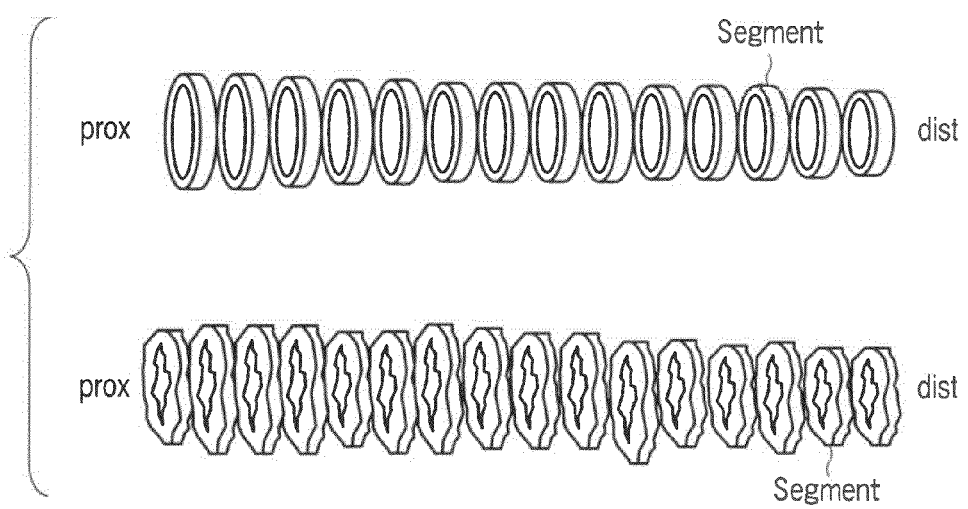
F I G. 5

IMAGE PROCESSING APPARATUS AND PROGRAM

CROSS-REFERENCE TO RELATED APPLICATIONS

This application is based upon and claims the benefit of priority from prior Japanese Patent Application No. 2008-115020, filed Apr. 25, 2008, the entire contents of which are incorporated herein by reference.

BACKGROUND OF THE INVENTION

1. Field of the Invention

The present invention relates to an image processing apparatus and program for arterial evaluation in an X-ray computed tomography apparatus (CT apparatus) or magnetic resonance imaging apparatus (MR apparatus), an X-ray angiography apparatus, an ultrasonic apparatus, an IVUS apparatus, or an OCT apparatus and, more particularly, to an image processing apparatus and program which are used to evaluate arterial atherosclerosis.

2. Description of the Related Art

For example, coronary arterial atherosclerosis mainly involves atherogenesis, lumen stenosis, arterial wall remodeling, and the like. Conventional methods of evaluating these phenomenon include coronary angiography (CAG), an ultrasonic apparatus, a coronary artery endoscopy, intravascular ultrasound (IVUS), and optical coherence tomography (optical CT or OCT). However, they are all invasive examination methods. In particular, these invasive diagnostic procedures have a risk of developing serious complications including death at the time of examination, and hence are not always safe. For this reason, the certain candidate for these examinations are limited to patients expecting percutaneus coronary intervention (PCI) for treatments and IVUS should not be used for patients with high risk to perform. In addition, evaluation of narrowing lumen (lumen stenosis) using coronary angiography (CAG) or an ultrasonic apparatus, which has been conventionally performed, is measurement on a projection image of arterial lumen, and hence leads to under-evaluation.

With the advent of multislice CT, contrast enhancement CT examination has been expected as noninvasive, useful examination. The examination data have been used to measure the ratio of arterial lumen and wall, remodeling indices, and clinical applications of this technique have begun to be studied.

In this case, the ratio of lumen stenosis can evaluate a vascular lumen state but cannot evaluate a remodeling state which has recently been considered important in the process of development of arterial atherosclerosis. In contrast, a remodeling index cannot properly evaluate a lumen stenois state. In addition, both the techniques are designed to compare with a reference region, and hence must set a reference region. Furthermore, reference regions might be derived from diffuse arterial atherosclerotic region, misleading to inadequate results.

In order to evaluate atherogenesis by using a CT apparatus, mural evaluation based on CT values is performed. However, owing to the influence of a contrast medium concentration, the limitation of a spatial resolution in currently available apparatuses, and the like, this evaluation is local evaluation and is not used to evaluate the overall target artery.

BRIEF SUMMARY OF THE INVENTION

It is an object of the present invention to effectively support evaluation of arterial atherosclerosis.

According to an aspect of the present invention, an image processing apparatus comprising: a storage unit which stores volume data associated with an area including a contrast-enhanced artery as an examination target; a first calculation unit which calculates a plurality of partial atherosclerotic indices associated with a plurality of portions of the artery on the basis of morphological information associated with the artery which is obtained from the volume data; a second calculation unit which calculates a whole atherosclerotic index associated with the entire artery including the plurality of portions on the basis of the morphological information associated with the artery; and a display unit which displays evaluation information based on the calculated whole atherosclerotic index.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a supplementary view for step S14 in FIG. 2;

FIG. 5 is a supplementary view for step S15 in FIG. 2;

DETAILED DESCRIPTION OF THE INVENTION

An embodiment of the present invention will be described below with reference to the views of the accompanying drawing.

An image processing apparatus according to this embodiment is singly used or incorporated in an X-ray computed tomography apparatus, magnetic resonance imaging apparatus, X-ray angiography apparatus, ultrasonic apparatus, IVUS apparatus, OCT apparatus, or PACS. Assume that the image processing apparatus is incorporated in an X-ray computed tomography apparatus. An atherosclerotic score calculation method to be described below can also be implemented by a program for causing a computer to implement the method.

X-ray computed tomography apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring, and only an X-ray tube rotates around an object to be examined. The present invention can be applied to either type. In this case, the rotate/rotate type, which is currently the mainstream, will be exemplified. In order to reconstruct one-slice tomographic image data, projection data corresponding to one rotation around an object to be examined, i.e., about 360°, is required, or (180°+view angle) projection data is required in the half scan method. The present invention can be applied to either of these reconstruction schemes. The former scheme will be exemplified here. As mechanisms of converting incident X-rays into electric charges, the following techniques are the mainstream: an indirect conversion type that converts X-rays into light through a phosphor such as a scintillator and converts the light into electric charges through photoelectric conversion elements such as photodiodes, and a direct conversion type that uses generation of electron-hole pairs in a semiconductor by X-rays and migration of the electron-hole pairs to an electrode, i.e., a photoconductive phenomenon. As an X-ray detection element, either of these schemes can be used. In this case, the former type, i.e., the indirect conversion type, will be exemplified. Recently, with advances toward the commercialization of a so-called multi-tube type X-ray computed tomography apparatus having a plurality of pairs of X-ray tubes and X-ray detectors mounted on a rotating frame, related techniques have been developed. The present invention can be applied to both a conventional single-tube type X-ray computed tomography apparatus and a multi-tube type X-ray computed tomography apparatus. The single-tube type X-ray computed tomography apparatus will be exemplified here.

Figure 1:
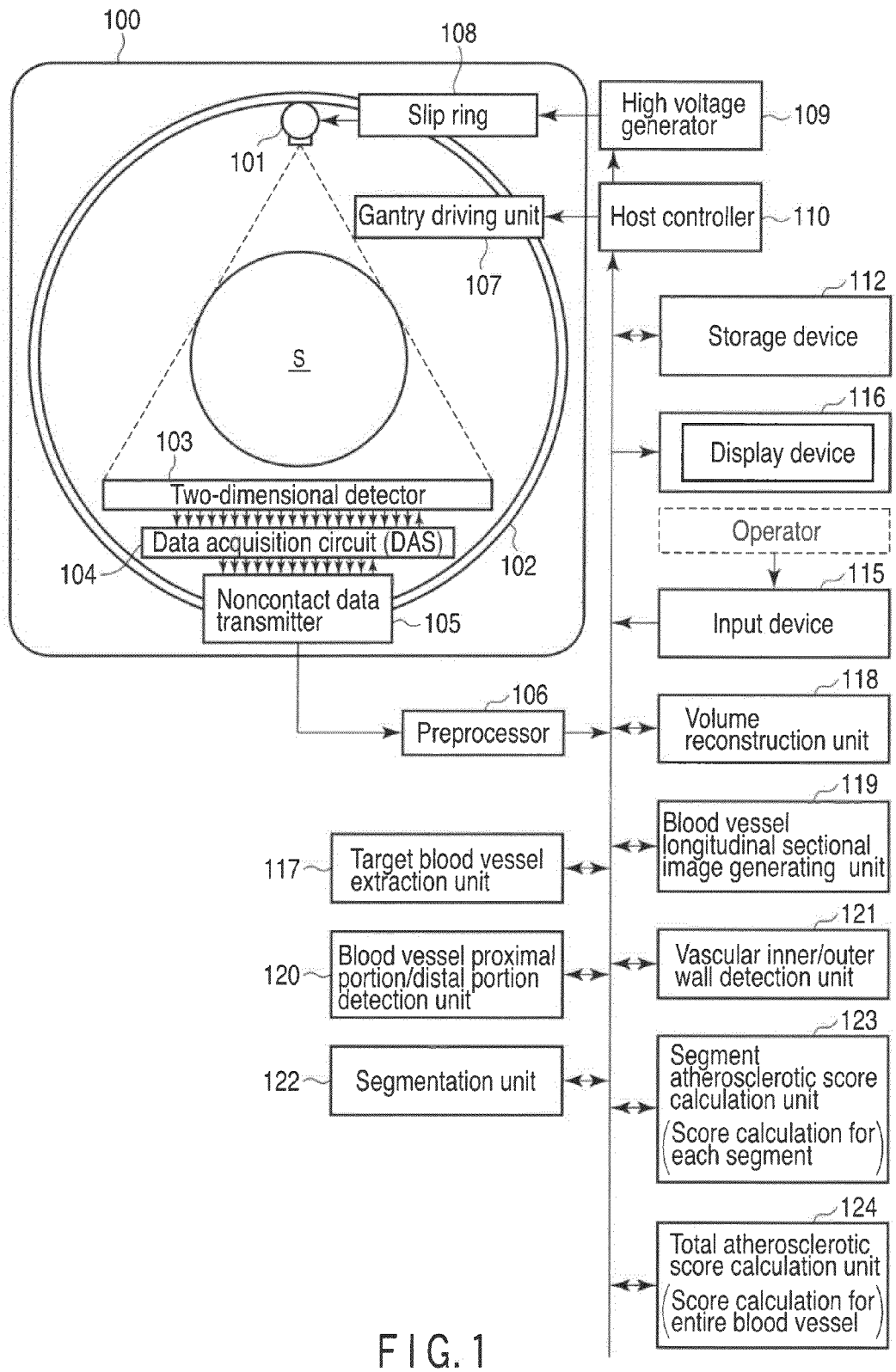
FIG. 1 is a block diagram showing the arrangement of an X-ray computed tomography apparatus having an image processing apparatus according to an embodiment of the present invention.
Figure 2:
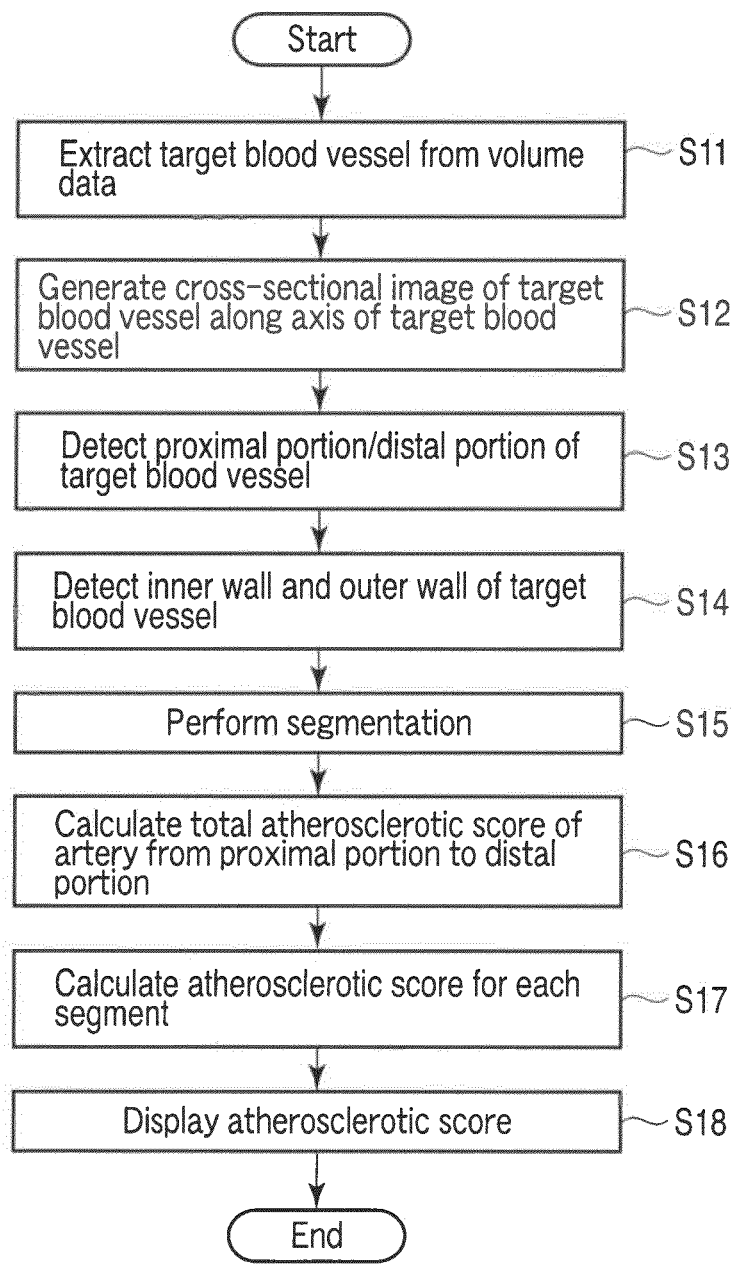
FIG. 2 is a flowchart showing a calculation processing sequence for atherosclerotic scores according to this embodiment.

FIG. 1 shows the arrangement of an X-ray computed tomography apparatus according to this embodiment. FIG. 2 shows an atherosclerotic score calculation processing sequence according to this embodiment.

A gantry 100 has an annular rotating frame 102 rotated/driven by a gantry driving unit 107. An X-ray tube 101 and X-ray detector 103 are mounted on the rotating frame 102. The X-ray detector 103 faces the X-ray tube 101 through an object inserted in a cavity (imaging area) S at the time of imaging. A high voltage continuously or periodically generated by a high voltage generator 109 is applied to the X-ray tube 101 through a slip ring 108. With this operation, cone-beam X-rays are generated. The X-ray detector 103 has a plurality of detection elements. The plurality of detection elements are arrayed along two orthogonal directions, i.e., the channel direction and the slice direction. The X-ray detector 103 having such an arrangement is generally called a multi-slice type detector (also called a two-dimensional array type detector).

A data acquisition circuit 104 generally called a DAS (data acquisition system) is connected to the output of the X-ray detector 103. The data acquisition system 104 has, for each channel, an I-V converter which converts a current signal from each channel of the X-ray detector 103 into a voltage, an integrator which periodically integrates these voltage signals in synchronism with an X-ray radiation period, a preamplifier which amplifies an output signal from the integrator, and an analog/digital converter which converts an output signal from the preamplifier into a digital signal. A preprocessor 106 receives an output (a digital signal (called pure raw data)) from the data acquisition circuit 104 via a noncontact data transmitter 105 which implements noncontact data transmission via light or magnetism, and executes preprocessing, e.g., correcting sensitivity irregularity between channels and correcting an extreme decrease in signal intensity or signal loss due to an X-ray absorber, mainly a metal portion. The data output from the preprocessor 106 is called raw data or projection data. The projection data is stored in a storage device 112, and is read out to a volume reconstruction unit 118 under the control of a host controller 110.

Figure 3:
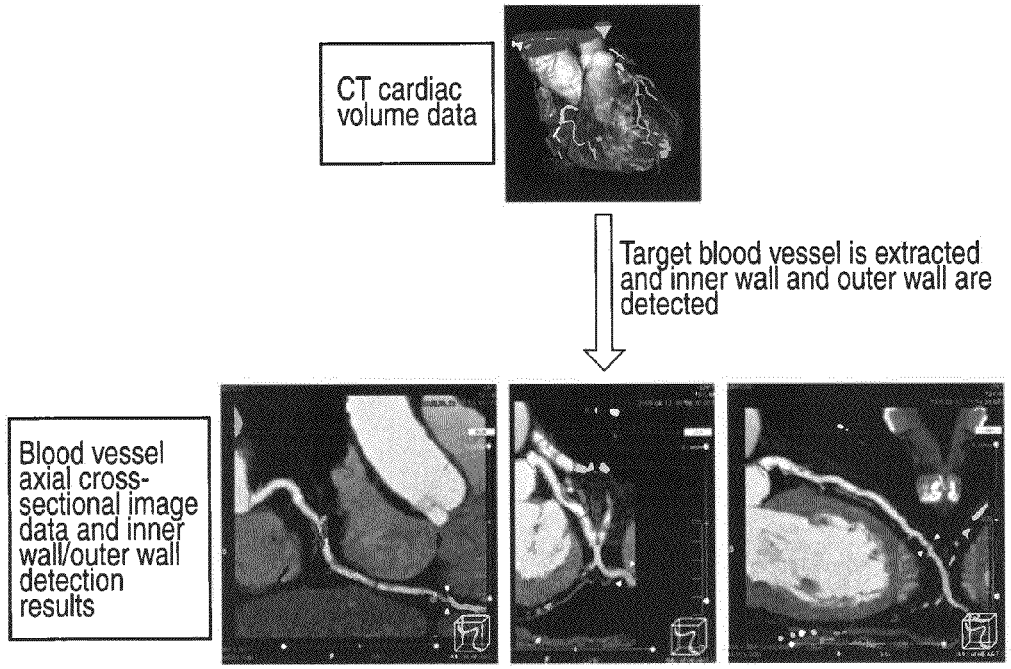
FIG. 3 is a supplementary view for steps S11 and S12 in FIG. 2.

The volume reconstruction unit 118 reconstructs volume data on the basis of the projection data set from the storage device 112 in accordance with a cone beam reconstruction method (see FIG. 3). This volume data is stored in the storage device 112, and is displayed as a visible image on a display device 116.

In addition to the storage device 112, the volume reconstruction unit 118, the display device 116, and an input device 115 including a keyboard, a pointing device, and the like, which are basic constituent elements of the X-ray CT apparatus, the following units are connected to the host controller 110: a target blood vessel extraction unit 117, a blood vessel longitudinal sectional image generating unit 119, a blood vessel proximal portion/distal portion detection unit 120, a vascular inner/outer wall detection unit 121, a segmentation unit 122, a segment atherosclerotic score calculation unit 123, and a whole atherosclerotic score calculation unit 124.

In this case, volume data covers an area including an arterial vessel as an examination target. The contrast of this arterial vessel lumen is enhanced by a contrast medium. The target vessel extraction unit 117 extracts a contrast-enhanced vessel image by, for example, threshold processing using a CT value (S11). If the target vessel is a coronary artery, the target vessel extraction unit 117 extracts three main branches and a blood vessel with a vascular outer wall diameter of 1 mm or more.

This embodiment can be applied to arteries in general, e.g., coronary arteries, aortae, carotid arteries, cerebral arteries, abdominal arterial branches (celiac artery, superior mesenteric artery, renal arteries, and inferior mesenteric arteries), and extremity peripheral arteries such as lower extremity arteries. The embodiment is further applied to internal thoracic arteries and gastroduodenal arteries used in coronary artery bypass grafting (CABG). In this case, a coronary artery in CT contrast enhancement cardiac examination will be exemplified as a target artery.

The vessel longitudinal sectional image generating unit 119 generates a vessel longitudinal sectional image associated with the extracted arterial vessel from volume data (S12). A vessel longitudinal sectional image is a concatenated image generated by cutting out a plurality of minute strip images from the volume data along the central axis of the extracted arterial vessel and concatenating them. A vessel longitudinal sectional image is a projection image obtained by projecting volume data within a predetermined range centered on the axis of an extracted arterial vessel.

The vessel proximal portion/distal portion detection unit 120 detects the proximal end portion and distal end portion of the target arterial vessel from the vessel longitudinal sectional image (S13). Typically, a branch portion of the target vessel is detected as a proximal portion, and a portion, of the vessel extending from the proximal portion, which has a diameter reduced to a predetermined value is detected as a distal portion. It suffices to automatically detect the start point and end point of an extracted target vessel as the proximal portion and distal portion of an arterial vessel or to specify the proximal portion and distal portion of a target vessel on a vessel longitudinal sectional image extracted by the operation of the input device 115 by a user in accordance with the designation of the start point and end point of the target vessel.

The vascular inner/outer wall detection unit 121 detects the vascular lumen boundary (inner wall) and vascular outer wall boundary (outer wall) shown in FIG. 4 from the vessel longitudinal sectional image on the basis of, for example, spatial CT value changes (S14). FIG. 3 shows the inner wall/outer wall detection results. This inner wall/outer wall detection processing can be performed not only by automatic processing but also by point designation by the user as in vessel extraction processing.

Figure 6:
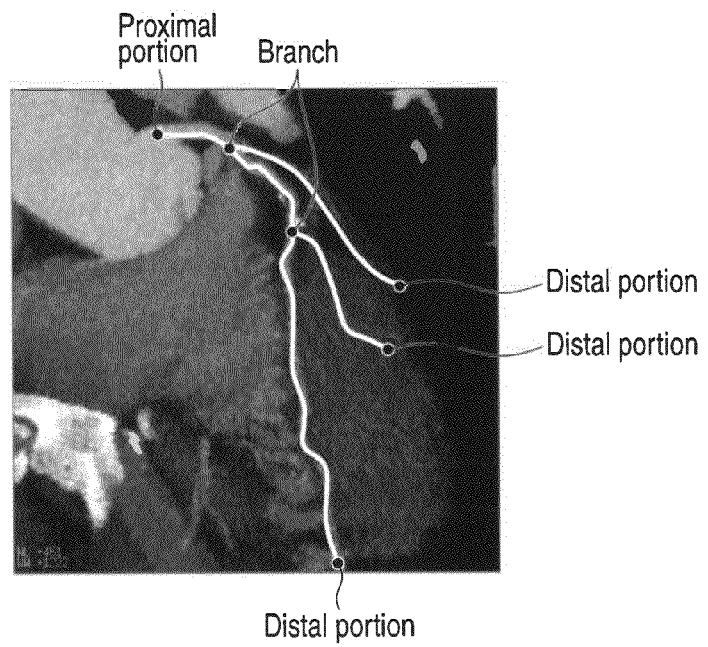
FIG. 6 is a supplementary view for step S13 in FIG. 2.

The segmentation unit 122 segments the entire vessel range from the proximal portion of the detected arterial vessel to its distal portion into a plurality of local portions (segments) (S15). For example, as shown in FIG. 6, when a vessel is extracted, a vessel branch point is detected, and intervals and branches segmented by the branch point are handled as anatomically local ranges (segments). The entire vessel range from the proximal portion of the detected arterial vessel to its distal portion is segmented into a plurality of segments at predetermined intervals along the axis, as shown in FIG. 5.

The whole atherosclerotic score calculation unit 124 calculates an atherosclerotic score within the entire vessel range from the proximal portion of the arterial vessel to its distal portion (S16). In the case of a coronary artery, for example, the whole atherosclerotic score calculation unit 124 performs this calculation within an entire dendritic coronary artery range from the proximal portions of left and right coronary arteries to their distal portions. That is, the segment based atherosclerotic score calculation unit 123 and/or the whole vessel based atherosclerotic score calculation unit 124) calculates a whole atherosclerotic score associated with the entire arterial vessel. The whole atherosclerotic score can be a single value obtained by weighting and adding atherosclerotic indices (atherosclerotic scores) corresponding to the respective segments or the value of the atherosclerotic score of a segment corresponding to a portion exhibiting a most serious symptom (the maximum value of the atherosclerotic scores of the respective segments). In consideration of the following shape characteristics of a healthy vessel and vessel with arterial atherosclerosis, an index for evaluating the atherosclerotic state of an entire artery as a target is calculated by using a blood length, vascular lumen volume (cross sectional area), a vascular wall volume (cross sectional area), and the like.

The segment atherosclerotic score calculation unit 123 calculates an atherosclerotic index (atherosclerotic score) corresponding to the degree of progress of arterial sclerosis for each segment on the basis of the shape (morphological) characteristics of the arterial blood vessel (S17). That is, the segment atherosclerotic score calculation unit 123 calculates a plurality of atherosclerotic scores respectively corresponding to a plurality of segments.

The cross-sectional shape of the lumen of a healthy blood vessel is almost circular. The healthy blood vessel has an almost uniform wall thickness with respect to the lumen. The healthy vessel tends to decrease almost regularly in diameter, cross-sectional area, and volume per unit length, from the proximal portion to the distal portion. The cross-sectional shape of an atherosclerotic vessel is almost circular but is also somewhat deformed. A narrowing portion of this vessel (lumen stenosis) has a small lumen area. The vessel wall area of a remodeling portion has a large area. The wall thickness of a lumen stenosis portion increases to the lumen side, whereas the wall thickness of a remodeling portion increases to the outer wall side. Unlike the healthy vessel, the atherosclerotic vessel loses the regularity of changes in diameter, cross-sectional area, and volume per unit length along the vessel axis.

In consideration of these tendencies, atherosclerotic scores such as the ratio between a vascular (Vessel) wall size and a lumen size are calculated by the following calculation methods.

(i) Ratio Between Vascular (Vessel) Wall Size and Lumen Size

The ratio between a vascular vessel wall size and a (vascular) lumen size at each of a plurality of vessel cross-sections of an entire target vessel is obtained, and the average value and maximum value of the ratios in the range from the proximal portion to the distal portion are calculated. A vascular vessel wall portion is largely responsible for a tendency associated with remodeling, whereas a lumen portion is largely responsible for a tendency associated with lumen stenosis.

first atherosclerotic score=Wall Volume/Lumen Volume

Wall Volume: the volume (or the area) of a vascular vessel wall between the inner wall and the outer wall Lumen Volume: the volume of the lumen surrounded by the inner wall A first atherosclerotic score includes the ratio between the size (volume or area) of a vascular vessel wall and the size of a lumen. The first atherosclerotic score tends to increase as the lumen volume decreases. This indicates that the first atherosclerotic score has a function of identifying the degree of arterial atherosclerosis by the volume of a lumen even if the volume of the vascular vessel wall remains the same. In addition, the first atherosclerotic score tends to increase as the volume of the vascular wall increases. This indicates that the first atherosclerotic score has a function of identifying the degree of arterial atherosclerosis by the volume of the vascular vessel wall even if the volume of the lumen remains the same.

(ii) Difference Amounts (Variation Amounts) Between Vascular Lumen Size and Vascular (Vessel) Wall Size (Lumen Diameter, Lumen Area, Lumen Volume, Vascular (Vessel) Wall Thickness, and Vascular (Vessel) Wall Area or Volume) of Target Vessel and Those of Estimated Healthy Vessel Model An estimated healthy vessel model of each target vessel is set. The differences (standard deviations SD) between the lumen diameter, lumen area, lumen volume, vascular wall thickness, and vascular wall area or volume of the estimated model and those of a measurement target vessel are obtained. The sum whole s of standard deviations −SD and +SD and the sum whole of the absolute values of the standard deviations are obtained. −SD indicates a tendency of lumen stenosis; +SD, a remodeling tendency; and the sum whole of the absolute values, an atherosclerotic state.

second atherosclerotic score=$\Sigma|SD(i)|((i=0$ to $n$ where $n$=vessel interval count(arbitrary))

(iii) Sizes (Volumes or Areas) of Vascular (Vessel) Lumen and Vascular (Vessel) Wall Normalized with Vessel Length The lumen volume and wall volume are normalized with the vessel length of a target vessel.

third atherosclerotic score=Lumen Volume/Length fourth atherosclerotic score 4=Wall Volume/Lumen Volume Wall Volume: volume of vascular vessel wall between inner wall and outer wall Lumen Volume: volume of lumen surrounded by inner wall Length: vessel length Note that these methods are targeted to an entire vessel or certain region of vessel, and do not require any reference region because measurement values (diameters, cross-sectional areas, and volumes) at any vessel positions set at predetermined intervals along the vessel axis are available.

In addition, a vulnerable index is calculated by combining the ratios between the above partial artery index, the above whole atherosclerotic index, and a calcified plaque index. For example, a partial artery index/calcified plaque index, whole atherosclerotic index/calcified plaque index, or the like is calculated as a vulnerable index. It suffices to obtain a vulnerable index by defining the relationship between an arterial atherosclerotic index, a calcified plaque index, and a vulnerable index using a correspondence table (conversion table) or a mathematical expression representing the correspondence relationship between the indices instead of using simple ratios. Note that a calcified plaque index is an index obtained by digitizing the calcified plaque index degree obtained on the basis of a CT value.

The segment atherosclerotic score calculation unit 123 and the whole atherosclerotic score calculation unit 124 each have a function of evaluating an atherosclerotic score. For each calculated atherosclerotic score, a threshold exhibiting a significant difference between a healthy group and a case group having atherosclerotic tendencies is set and is presented as evaluation information for evaluating a degree of arterial atherosclerosis. In addition, as the evaluating information of an atherosclerotic score, a critical degree which is the maximum value of an atherosclerotic index and includes local lumen stenosis can be presented in addition to the atherosclerotic index of the entire target vessel. For example, a critical degree is an index indicating the degree of abnormality of a vessel which is obtained by using both an atherosclerotic index and a degree of lumen stenosis. This index allows to evaluate that arterial atherosclerosis worsens even if the degree of lumen stenosis is low, or arterial atherosclerosis is not serious even though a lumen stenosis exists. A critical degree can be obtained by defining the relationship between an atherosclerotic index and a degree of lumen stenosis using a correspondence table (conversion table) or mathematical expression representing the correlation relationship between them.

Figure 7:
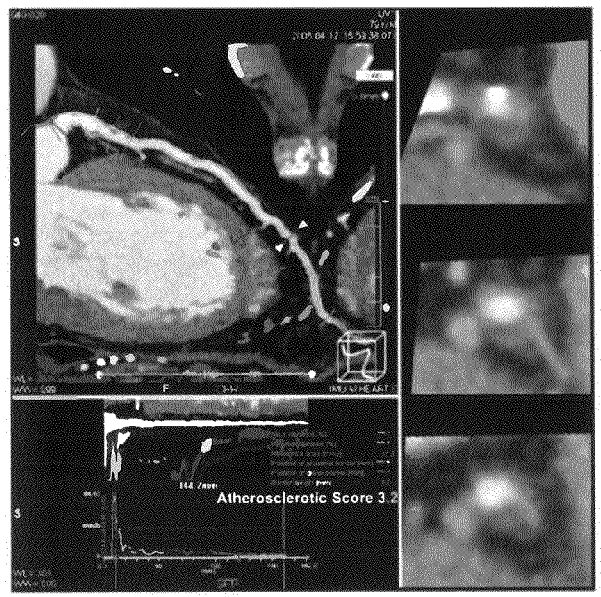
FIG. 7 is a view showing an example of a frame displayed in step S18 in FIG. 2.
Figure 8:
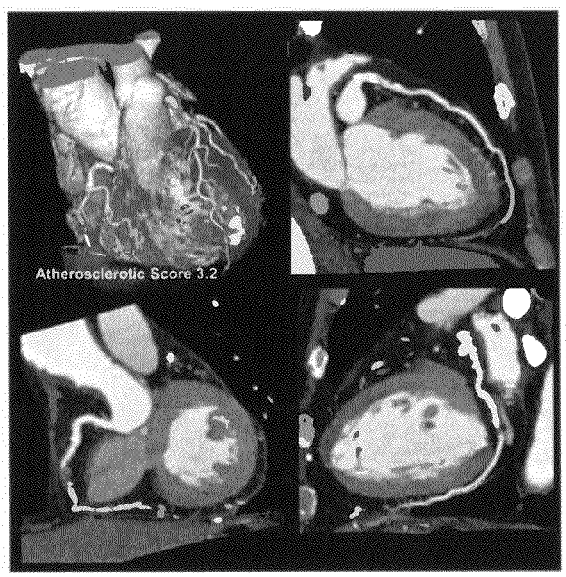
FIG. 8 is a view showing another example of the frame displayed in step S18 in FIG. 2.

The segment atherosclerotic score calculation unit 123 and the whole atherosclerotic score calculation unit 124 each have a function of simultaneously displaying a 3D image (CTA image) indicating the running state of a target vessel, a CPR image indicating a vessel cross-sectional state, a projection image, and a vessel cross-sectional image altogether (S18), as shown in FIGS. 7 and 8. In a case exhibiting an atherosclerotic tendency, a portion having an atherosclerotic risk value or more is marked on a 3D image (CTA image), CPR image, or projection image, and the corresponding vessel cross-sectional image is automatically selected and displayed. This image is displayed together with a critical degree by using a displayed color distribution.

Figure 10:
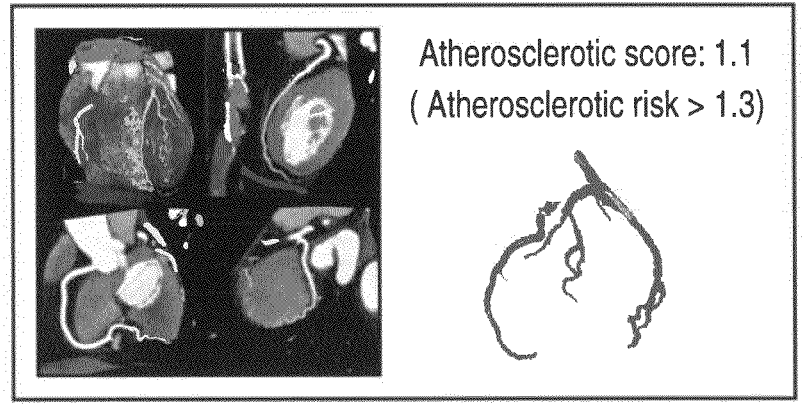
FIG. 10 is a view showing still another example of the frame displayed in step S18 in FIG. 2.
Figure 11:
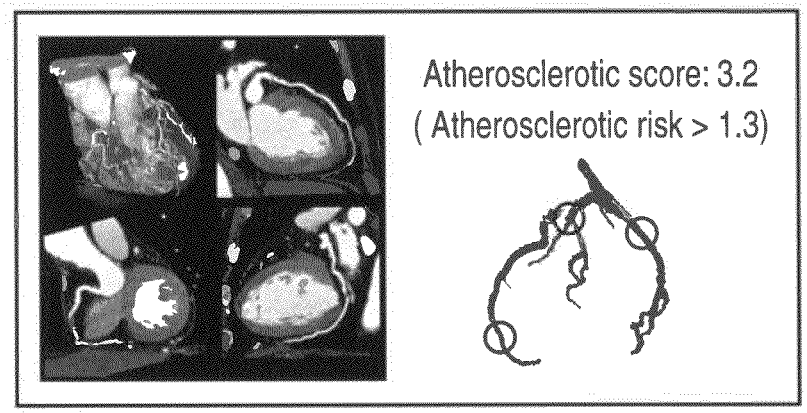
FIG. 11 is a view showing still another example of the frame displayed in step S18 in FIG. 2.

FIG. 10 shows a display frame of the atherosclerotic score of an entire vessel. FIG. 11 shows a display frame of an atherosclerotic score for each segment. A 3D image of volume data, a longitudinal sectional image, and a 3D image of an extracted vessel are displayed together with a numerical value representing a score. For a segment with a score exceeding a threshold (1.3), a mark is displayed on a 3D image of the blood vessel.

Figure 9:
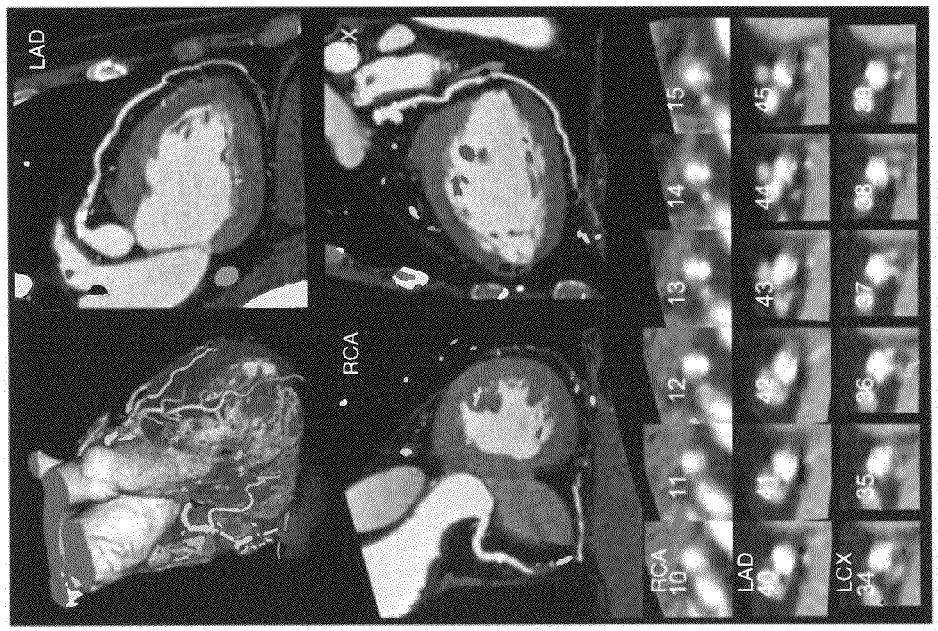
FIG. 9 is a view showing an example of a report frame generated in this embodiment.

As shown in FIG. 9, a report is output, which includes the values of the respective main vessel regions (the three main branches and the respective coronary artery segments to be precise) together with the values of the entire vessel. A 3D image with an arterial sclerosis portion being marked, a vessel long axis image such as a CPR image for evaluating a vessel cross-section, and a vessel cross-sectional image of the portion also constitute the report.

Methods of modeling an estimated vessel include a method of obtaining a model by normalization from a measurement target vessel and a method of obtaining a model by approximation from the feature amount of an artery. An atherosclerotic evaluation index (atherosclerotic score) which can simultaneously evaluate both lumen stenosis and remodeling can be calculated from morphological characteristics.

Displaying associated images together with calculated parameter values and superimposing regions exhibiting high atherosclerotic severity or risks on the images allows the user to simultaneously recognize the shapes and the values. That is, this display method is easy to understand. This allows the user to simultaneously evaluate local portions (certain region of vessel) as well as the entire vessel. The method allows evaluation without setting any reference, and hence can reduce misevaluation of the severity of arterial atherosclerosis, the amount of operation and the differences in result between different operators.

Note that the present invention is not limited to the above embodiment, and constituent elements can be variously modified and embodied at the execution stage within the spirit and scope of the invention. Various inventions can be formed by proper combinations of a plurality of constituent elements disclosed in the above embodiments. For example, several constituent elements may be omitted from the all the constituent elements in each embodiment. In addition, constituent elements of the different embodiments may be combined as needed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus, comprising:
    a storage unit which stores volume data associated with an area including a contrast-enhanced artery as an examination target;
    a size calculation unit which calculates a vascular vessel lumen size and a vascular vessel wall size associated with an entire range from a proximal portion of the artery to a distal portion thereof, based on the volume data;
    an index calculation unit which calculates a single atherosclerotic index associated with the entire range of the artery based on the vascular vessel wall size and the vascularvessel lumen size; and
    a display unit which displays the atherosclerotic index,
    wherein the size calculation unit calculates a first difference amount between a vascular lumen size of an estimated healthy blood vessel model and the calculated vascular lumen size, calculates a second difference amount between a size of the estimated healthy blood vessel model and the calculated vascular wall size, and calculates the atherosclerotic index based on the first difference amount and the second difference amount.

2. The apparatus according to claim 1, wherein the atherosclerotic index includes a ratio between the vascular wall size and the vascular lumen size.

3. The apparatus according to claim 1, wherein the first calculation unit normalizes the calculated vascular lumen size with a blood vessel length, normalizes the calculated vascular wall size with the blood vessel length, and calculates the atherosclerotic index based on the normalized vascular lumen size and the normalized vascular wall size.

4. The apparatus according to claim 1, further comprising a detection unit which detects the proximal portion of the artery and the distal portion thereof based on the volume data.

5. The apparatus according to claim 1, further comprising a local index calculation unit which calculates a plurality of atherosclerotic indexes associated with a plurality of local portions included in a range of the artery based on the vascular vessel wall size and the vascular vessel lumen size.

\* \* \* \* \*